(12) United States Patent
Lato

(10) Patent No.: US 7,278,371 B1
(45) Date of Patent: Oct. 9, 2007

(54) SELF-LEVELING WET/DRY TUBE FEEDER

(76) Inventor: Ray Lato, N. 14160 County Road M, Thorp, WI (US) 54771

( * ) Notice: Subject to any disclaimer, the term of this patent is extended or adjusted under 35 U.S.C. 154(b) by 0 days.

(21) Appl. No.: 11/516,261

(22) Filed: Sep. 6, 2006

Related U.S. Application Data

(63) Continuation-in-part of application No. 10/874,613, filed on Jun. 22, 2004, now abandoned.

(60) Provisional application No. 60/482,219, filed on Jun. 23, 2003.

(51) Int. Cl.
*A01K 5/00* (2006.01)
(52) U.S. Cl. .................................................. 119/51.5
(58) Field of Classification Search .................. 119/72, 119/51.01, 51.5, 52.1
See application file for complete search history.

(56) References Cited

U.S. PATENT DOCUMENTS

| 3,971,341 | A | * | 7/1976 | Bron | 119/72 |
| 4,527,513 | A | * | 7/1985 | Hart et al. | 119/51.5 |
| 5,311,838 | A | * | 5/1994 | Thomas et al. | 119/51.5 |
| 6,192,831 | B1 | * | 2/2001 | Brunse | 119/51.5 |
| 6,843,206 | B1 | * | 1/2005 | Knippelmeir | 119/77 |
| 6,868,801 | B2 | * | 3/2005 | Rovira Badia et al. | 119/51.5 |

FOREIGN PATENT DOCUMENTS

DE 29611073 U1 * 9/1996

* cited by examiner

Primary Examiner—Son T. Nguyen
(74) Attorney, Agent, or Firm—Tipton L. Randall

(57) ABSTRACT

A wet/dry feeding device for the watering of live stock, primarily smaller animals, such as grower pigs, comprising a vacuum valve 1 with a diaphragm, water holding reservoir pans 4, water leveling tube 6, and double walled water feeding tube 5. The water level is automatically maintained within the reservoir pans 4 by an adjustable water feeding tube 5 which is placed into the water at a perpendicular angle to the water surface. At the top of the water feeding tube 5, a vacuum valve 1 with a diaphragm is located to allow water into the reservoir pans 4 until the water level enters the feeding tube sleeve, thereby activating the vacuum valve 1, and ceasing the flow of water.

9 Claims, 3 Drawing Sheets

WET-DRY FEEDER

WET-DRY FEEDER

US 7,278,371 B1

SELF-LEVELING WET/DRY TUBE FEEDER

CROSS-REFERENCE TO RELATED APPLICATIONS, IF ANY

This application is a continuation-in-part of utility application Ser. No. 10/874,613, filed 22 Jun. 2004 now abandoned. Application Ser. No. 10/874,613 is hereby incorporated by reference. This application also claims the benefit under 35 U.S.C. §119(e) of provisional application Ser. No. 60/482,219, filed 23 Jun. 2003. Application Ser. No. 60/482,219 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates generally relates to maintaining a constant level of fluid in a container via a remote source of fluid. More particularly, the invention relates to an apparatus for continuously providing both water and feed to animals in a controlled fashion.

2. Background Information

Many containers which need to maintain a specific level of fluid will run below that level if not checked by regular human measurement. This situation applies to many varied environments, including Christmas tree stands, house plants, water containers for pets, liquid chemical distribution vats in industrial environments, and in the distribution of water and feed to penned and field livestock. It would be advantageous to provide a low-cost apparatus which maintains desired fluid levels in these and other applications without requiring excessive human involvement.

Applicant has devised a wet/dry feeding device apparatus that overcomes the problem of providing and maintaining both dry feed and water to penned and field livestock with only infrequent human intervention.

SUMMARY OF THE INVENTION

It is an object of this invention to provide an apparatus tube feeder 2 for pigs with flat dry area 8 for feed and separate built-in cup area for water, which maintains water in an open reservoir pan 4 at a constant level. According to the invention, a constant water supply apparatus includes a vacuum valve 1, a reservoir pan 4, and a self leveling water pipe 6, all in fluid communication with one another, and a mechanism for maintaining the water in the reservoir pan 4 at a constant height. As water is forced into the open reservoir pan 4 via a water feeding tube 5, a vacuum valve 1 containing a diaphragm 14 is activated when the water level in the reservoir pan 4 reaches the bottom of the water feeding tube 5. Once activated by air pressure, the vacuum valve 1 stops the flow of water into the reservoir pan 4. The self leveling water pipe 6, which travels horizontally to connect several water reservoir pans 4, allows unimpeded flow of water, thereby leveling all the water in the reservoir pans 4.

DESCRIPTION OF THE EMBODIMENTS

Nomenclature
  1 Vacuum Valve with Diaphragm
  2 Dry Feed Tubes
  3 Structural Frame
  4a First Reservoir Pan
  4b Second Reservoir Pan
  4c Third Reservoir Pan
  5 Double Walled Water Feeding Tube
  6 Self Leveling Water Pipe
  7 U-bolt Clamp for Water Tube
  8 Raised Dry Area of Second Reservoir Pan
  9 Nuts of U-bolt Clamp
  10 Wet/Dry Feeding Device
  11 Casing Member
  12 Casing Member
  13 Threaded Fastener Members
  14 Diaphragm Member
  15 Interior Compartment
  16 Interior Compartment
  17 Water Inlet Port
  18 Water Supply Pipe
  19 Water Shutoff Lever
  20 Flexible Interior Tube
  21 Lower End of Flexible Interior Tube
  22 Lower End of Water Feeding Tube
  23 Lever Member
  24 Bracket Member
  25 Lever and Bracket Assembly Construction The current invention allows the disbursement of water to a feed tray without the use of float valves and automatically adds water when the level in the reservoir pan drops below a predetermined level. The current device operates more effectively than the industry standard pressure nipples, which require the animal to nudge or suck on the pressure nipple. Many small animals cannot reach the nipple or do not know how to operate the device. Smaller or baby pigs are not capable of learning the technique required to activate the pressure nipples, therefore making the current device more effective in watering such small animals. The present invention is embodied in a new and novel method and apparatus for delivering water to livestock, primarily pigs.

Figure 1:
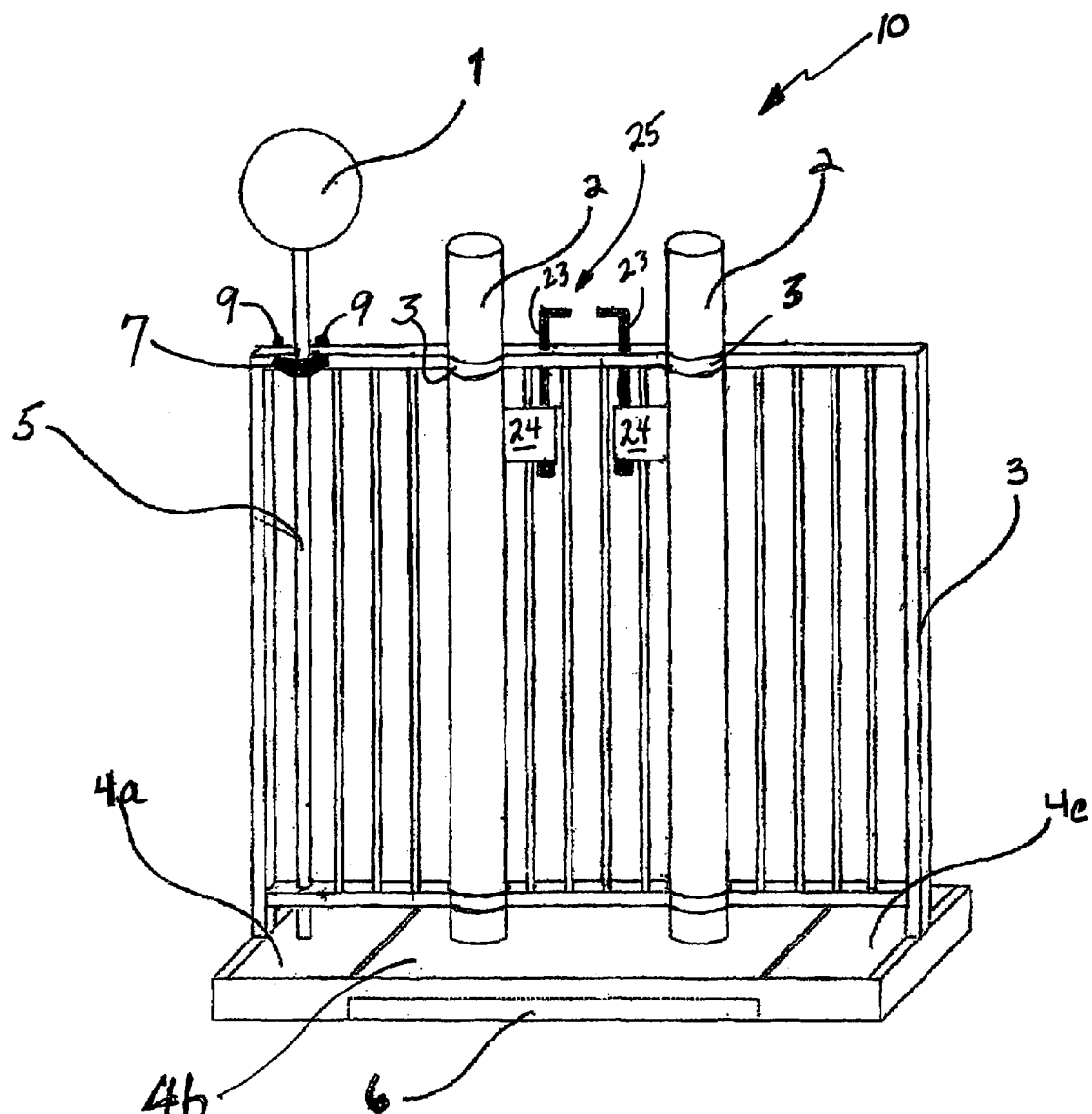
FIG. 1 is a perspective view of the wet/dry feeding device of the present invention.

Referring now to FIG. 1, a perspective view of the wet/dry feeding device 10 of the present invention is shown. The device 10 includes a vacuum valve control mechanism 1 with a diaphragm for controlling water flow, with a double walled water supply tube 5 in communication with the vacuum valve control mechanism 1 for discharging water or ceasing water discharge. A first reservoir pan 4a receives water from the water supply tube 5. There is a dry feed tube 2 for delivering dry feed to a flat, dry area 8 of a second reservoir pan 4b, the flat dry area 8 elevated above a selected level of water in the first reservoir pan 4a. A third reservoir pan 4c is in fluid communication with the first reservoir pan 4a by a means of a horizontal leveling tube member 6 there between, the leveling tube member 6 providing water flow between the first reservoir pan 4a and the third reservoir pan 4c, thereby maintaining equal water levels in the first and third reservoir pans. A frame member 3 is attached to the first reservoir pan 4a and supports the double walled water supply tube 5 with attached vacuum control valve mechanism 1 in a vertical orientation. The frame member 3 is positioned above the second reservoir pan 4b and supports the dry feed tube 2 in a vertical orientation. The frame member 3 is also attached to the third reservoir pan 4c. The double walled water supply tube 5 has a U-bolt clamp 7 adjustably secured thereto, the U-bolt clamp 7 providing adjustment of the position of the double walled water supply tube 5 relative to the first reservoir pan 4a. The dry feed tube 2 is supported at the top and bottom within apertures in the frame member 3, as illustrated in FIG. 1. The elevation of the dry feed tube 2 relative to the flat, dry area 8 of the second reservoir pan 4b is adjusted by a lever and bracket assembly 25, including a lever member 23 vertically mounted within a threaded aperture in the frame member 3. The lower end of the lever member 23 is rotatably fastened to a bracket member 24, which is rigidly secured to the dry feed tube 2. The upper end of the lever member 23 includes a handle for rotating the lever member 23, thereby raising or lowering the dry feed tube 2, depending upon the direction of rotation of the lever member 23.

Figure 2:
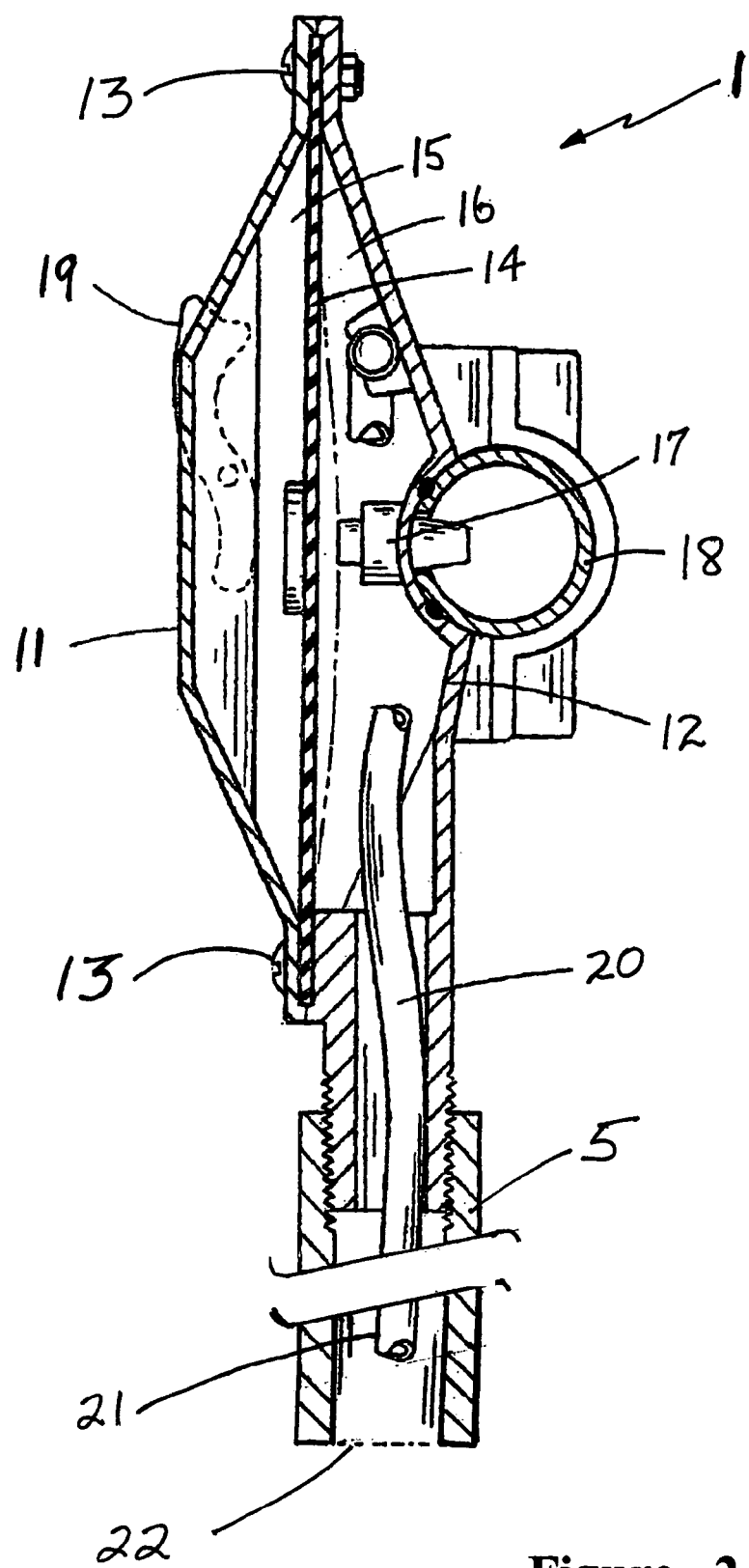
FIG. 2 is a sectional view of the vacuum valve mechanism of the wet/dry feeding device of the present invention.

The vacuum valve 1 is shown in a cross sectional view in FIG. 2. A conventional vacuum water valve 1, such as manufactured by Rotecna S. A., Poligono Industrial. Nave n.3, 5310 Agramunt (Lleida) Spain, is mounted to the upper end of water feeding tube 5, as illustrated in FIGS. 1 and 2. The vacuum valve 1 includes casing members 11 and 12, which are secured together at their peripheries by means of threaded fasteners 13. A diaphragm member 14 is secured to the peripheries of casing members 11 and 12 to define compartment portions 15 and 16 within the valve 1. A water inlet port 17 extends inwardly through casing member 12 so that the inner end thereof is in communication with one compartment portion 16, as illustrated in FIG. 2. The water inlet port 17 is in fluid communication with the interior of a water pipe or tube 18, which is in fluid communication with a source of water so that water is supplied to the compartment portion 16. The diaphragm member 14 is adapted to seal the inner end of the port 17 to prevent water from entering the interior of the compartment portion 16. The vacuum valve 1 also includes a conventional water shut-off mechanism in the form of a lever 19.

A flexible plastic tube 20 is provided in the water vacuum valve 1, as illustrated in FIG. 2, and has its lower end 21 positioned slightly above the lower end 22 of water feeding tube 5, as seen in FIG. 2. The lower end 22 of water feeding tube 5 is initially positioned slightly above the bottom of the first reservoir pan 4a. In normal operation, water is supplied to the inlet port 17 and flows downwardly between the tube 20 and the interior of water feeding tube 5, and continues to flow until water in the first reservoir pan 4a the reaches the lower end 22 of water feeding tube 5. When the water in the first reservoir pan 4a reaches the lower end 22 of water feeding tube 5, the vacuum within the compartment 16 in the valve 1 causes the diaphragm member 14 to seal upon the inner end of the inlet port 17, thereby preventing further water from flowing into the first reservoir pan 4a. As the water level in the first reservoir pan 4a drops below the lower end 22 of water feeding tube 5, this causes the diaphragm member 14 to unseat from the inner end of the inlet port 17 so that additional water is supplied to the first reservoir pan 4a. When the water level in the first reservoir pan 4a again rises above the lower end 22 of water feeding tube 5, this again causes the diaphragm member 14 to seal or close the inner end of water inlet port 17.

The vertical position of the water feeding tube 5 is adjusted by means of the U-bolt clamp 7 that encircles the water feeding tube 5 and is mounted to apertures in the frame member 3. The U-bolt clamp 7 includes threaded ends with attachment nuts 9, which, when tightened, holds the water feeding tube 5 between the U-bolt clamp 7 and the frame member 3. Raising the water feeding tube 5 relative to the U-bolt clamp 7 raises the lower end 22 of the water feeding tube 5 relative to the first reservoir pan 4a. This vertical adjustment of the water feeding tube 5 raises the level of water within the first reservoir pan 4a.

One of the significant aspects of the present invention is the use of the vacuum valve 1 above the water collecting first reservoir pan 4a, allowing the operator to preadjust the water level in the collecting reservoir pan 4a. The water is then fed to the reservoir pan 4a, under constant pressure, until the water level reaches the bottom of the feeding tube 5, which activates the diaphragm 14 within the vacuum valve 1, temporarily shutting off the water. Once the water drops below the bottom end 22 of the water feeding tube 5, the valve 1 opens allowing additional water to flow into the reservoir pan 4a.

Figure 3:
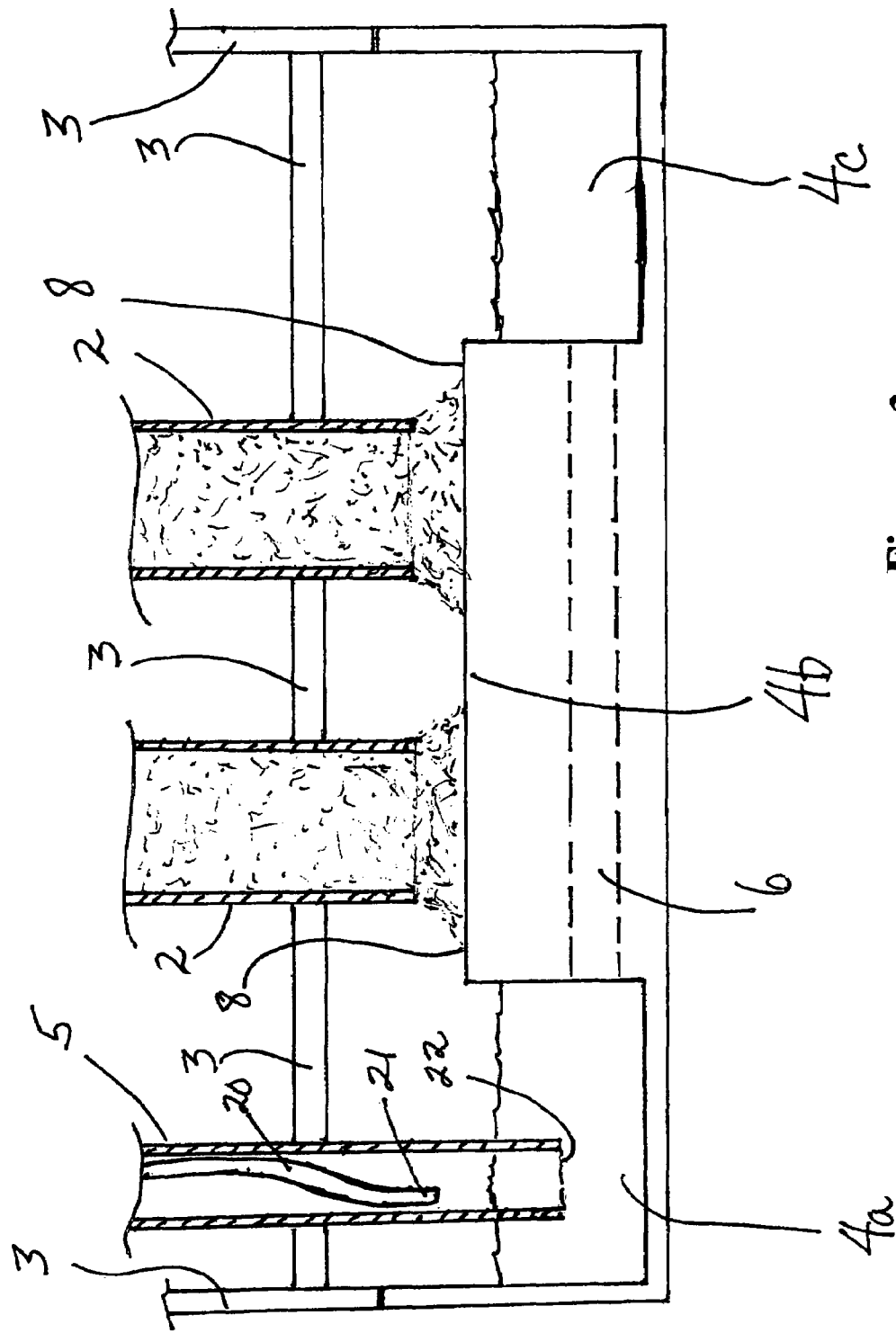
FIG. 3 is a sectional view of the reservoir pan area of the wet/dry feeding device of the present invention.

Referring now to FIG. 3, a cross sectional view of the lower portion of the wet/dry feeding device 10 is illustrated in operation. The second reservoir pan 4b includes a flat, dry area 8 elevated above the water level in the first reservoir pan 4a, which maintains the feed from the dry feed tube 2 in a dry condition. The dry feed tube 2 is mounted with an open end adjacent the flat dry area 8 of the second reservoir pan 4b so that the amount of feed that flows from the dry feed tube 2 is limited. As the feed is consumed, additional feed from the dry feed tube 2 flows onto the flat, dry area 8 of the second reservoir pan 4b. The distance between the dry feed tube 2 and the flat, dry area 8 is adjusted by means of the lever and bracket assembly 25. The lever member 23 is rotatably mounted in a threaded aperture in the frame member 3 and rotatably fastened to the bracket member 24, which is rigidly attached to the dry feed tube 2, as described above.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new self leveling wet/dry tube feeder apparatus and method which have many of the advantages of the closures mentioned heretofore and many novel features that result in a self leveling wet/dry tube feeder which is not anticipated, rendered obvious, suggested, or even implied by any of the prior art tool guides, either alone or in any combination thereof.

It is another object of the present invention to provide a new self leveling wet/dry tube feeder which may be easily and efficiently manufactured and marketed.

It is a further object of the present invention to provide a new self leveling wet/dry tube feeder which is of a durable and reliable construction.

An even further object of the present invention is to provide a new self leveling wet/dry tube feeder which is susceptible of a low cost of manufacture with regard to both materials and labor, and which accordingly is then susceptible of low prices of sale to the consuming public, thereby making such wet/dry tube feeder devices economically available to the buying public.

Still yet another object of the present invention is to provide a new self leveling wet/dry tube feeder which provides in the apparatuses and methods of the prior art some of the advantages thereof, while simultaneously overcoming some of the disadvantages normally associated therewith.

Yet another object of the present invention is to provide a new self leveling wet/dry tube feeder which includes a structural frame 3, vacuum valve 1 with diaphragm 14, water collecting reservoir pan 4a, horizontal leveling tube 6 and sleeved water feeding tube 5.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

While the invention has been particularly shown and described with reference to preferred embodiments thereof, it will be understood by those skilled in the art that various changes in form and details may be made therein without departing from the spirit and scope of the invention.

I claim:

1. A wet/dry feeding device consisting of:
   a) a vacuum valve control mechanism with a diaphragm for controlling water flow;
   b) a water supply tube in communication with the vacuum valve control mechanism for discharging water or ceasing water discharge;
   c) a first reservoir pan for receiving water from the water supply tube;
   d) adjustment means for varying the position of the water supply tube relative to the first reservoir pan to maintain a selected level of water therein;
   e) a dry feed tube for delivering dry feed to a flat, dry area of a second reservoir pan, the flat, dry area elevated above the selected level of water in the first reservoir pan; and
   f) adjustment means for varying the position of the dry feed tube relative to the second reservoir pan, said adjustment means including a frame member positioned above the second reservoir pan for supporting the dry feed tube in a vertical orientation, and a lever and bracket assembly external the dry feed tube and adjustably secured to the dry feed tube and the frame member for suspending the dry feed tube above the second reservoir pan.

2. The wet/dry feeding device of claim 1, wherein the adjustment means for varying the position of the water supply tube relative to the first reservoir pan includes a frame member attached to the first reservoir pan for supporting the water supply tube with attached vacuum control valve mechanism in a vertical orientation, and a U-bolt clamp adjustably secured to the water supply tube and frame member for suspending the water supply tube above the first reservoir pan.

3. The wet/dry feeding device of claim 1, wherein the water supply tube is a double walled tube.

4. The wet/dry feeding device of claim 1, wherein the lever and bracket assembly includes a lever member vertically mounted within a threaded aperture in the frame member, the lever member rotatably fastened at a lower end to a bracket member rigidly secured to the dry feed tube, whereby rotation of the lever member raises or lowers the dry feed tube depending upon the direction of ration of the lever member.

5. A wet/dry feeding device consisting of:
   a) a vacuum valve control mechanism with a diaphragm for controlling water flow;
   b) a water supply tube in communication with the vacuum valve control mechanism for discharging water or ceasing water discharge;
   c) a first reservoir pan for receiving water from the water supply tube;
   d) a dry feed tube for delivering dry feed to a flat, dry area of a second reservoir pan, the flat dry area elevated above a selected level of water in the first reservoir pan; and
   e) a frame member attached to the first reservoir pan and supporting the water supply tube with attached vacuum control valve mechanism in a vertical orientation, the frame member positioned above the second reservoir pan and supporting the dry feed tube in a vertical orientation, the water supply tube having a U-bolt clamp adjustably secured thereto and to the frame member, the U-bolt clamp providing adjustment of the position of the water supply tube relative to the first reservoir pan, the dry feed tube having a lever and bracket assembly external the dry feed tube and adjustably secured there to and to the frame member for adjustment of the position of the dry feed tube relative to the flat, dry area of the second reservoir pan.

6. The wet/dry feeding device of claim 5, wherein the lever and bracket assembly includes a lever member vertically mounted within a threaded aperture in the frame member, the lever member rotatably fastened at a lower end to a bracket member rigidly secured to the dry feed tube, whereby rotation of the lever member raises or lowers the dry feed tube depending upon the direction of ration or the lever member.

7. A wet/dry feeding device consisting of:
a) a vacuum valve control mechanism with a diaphragm for controlling water flow;
b) a double walled water supply tube in communication with the vacuum valve control mechanism for discharging water or ceasing water discharge;
c) a first reservoir pan for receiving water from the water supply tube d) a second reservoir pan for receiving dry feed;
e) a dry feed tube for delivering dry feed to a flat, dry area of the second reservoir pan, the flat dry area elevated above a selected level of water in the first reservoir pan;
f) a third reservoir pan in fluid communication with the first reservoir pan by a horizontal leveling tube member there between, the leveling tube member providing water flow between the first and third reservoir pans, thereby maintaining equal water levels in the first and third reservoir pans; and
g) a frame member attached to the first reservoir pan and supporting the double walled water supply tube with attached vacuum control valve mechanism in a vertical orientation, the frame member positioned above the second reservoir pan and supporting the dry feed tube in a vertical orientation, the frame member also attached to the third reservoir pan, the double walled water supply tube having a U-bolt clamp adjustably secured thereto and to the frame member, the U-bolt clamp providing adjustment of the position of the double walled water supply tube relative to the first reservoir pan, the dry feed tube having a lever and bracket assembly external the dry feed tube and adjustably secured there to and to the frame member for adjustment of the position of the dry feed tube relative to the flat, dry area of the second reservoir pan.

8. The wet/dry feeding device of claim 7, wherein the first and third reservoir pans are separated by the second reservoir pan receiving the dry feed to the flat, dry area therein.

9. The wet/dry feeding device of claim 7, wherein the lever and bracket assembly includes a lever member vertically mounted within a threaded aperture in the frame member, the lever member rotatably fastened at a lower end to a bracket member rigidly secured to the dry feed tube, whereby rotation of the lever member raises or lowers the dry feed tube depending upon the direction of ration of the lever member.

* * * * *